(12) United States Patent
Higuchi et al.

(10) Patent No.: US 11,550,188 B2
(45) Date of Patent: Jan. 10, 2023

(54) LIQUID CRYSTAL DISPLAY DEVICE

(71) Applicant: Japan Display Inc., Tokyo (JP)

(72) Inventors: Ayaka Higuchi, Tokyo (JP); Koichi Igeta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/448,718

(22) Filed: Sep. 24, 2021

(65) Prior Publication Data

US 2022/0100039 A1 Mar. 31, 2022

(30) Foreign Application Priority Data

Sep. 25, 2020 (JP) .............................. JP2020-160952

(51) Int. Cl.
*G02F 1/1337* (2006.01)
*G02F 1/1335* (2006.01)
*G02F 1/1339* (2006.01)

(52) U.S. Cl.
CPC ...... *G02F 1/133723* (2013.01); *G02F 1/1339* (2013.01); *G02F 1/133514* (2013.01); *G02F 1/133788* (2013.01)

(58) Field of Classification Search
CPC ................................................. G02F 1/133723
See application file for complete search history.

(56) References Cited

U.S. PATENT DOCUMENTS

| 2010/0060836 | A1 | 3/2010 | Kunimatsu et al. | |
|---|---|---|---|---|
| 2011/0199565 | A1* | 8/2011 | Kunimatsu ............ | C09K 19/56 438/30 |
| 2012/0224114 | A1 | 9/2012 | Kunimatsu et al. | |
| 2016/0085119 | A1* | 3/2016 | Hirota ............... | G02F 1/133788 349/33 |
| 2016/0103368 | A1 | 4/2016 | Imanishi | |
| 2020/0166809 | A1* | 5/2020 | Kiyota .................. | G02F 1/1339 |

FOREIGN PATENT DOCUMENTS

| JP | 2009-288298 A | 12/2009 |
|---|---|---|
| JP | 2012-185232 A | 9/2012 |
| JP | 2016-066053 A | 4/2016 |
| JP | 2016-080796 A | 5/2016 |
| WO | WO 2011/115078 A1 | 9/2011 |

* cited by examiner

*Primary Examiner* — Edmond C Lau

(74) *Attorney, Agent, or Firm* — Maier & Maier, PLLC

(57) ABSTRACT

The purpose of the present invention is to realize the photo alignment film which has good alignment ability and good adhesive strength with the seal material. The structure of the invention is:

A liquid crystal display device including a first substrate, having pixel electrodes and a first alignment film, and a second substrate adhere to each other by seal material, and the liquid crystal being sealed inside, in which the first alignment film is formed from a first polyimide, which receives a photo alignment treatment, and a second polyimide, which does not receive the photo alignment treatment, the first polyimide exists 75 to 98 weight % at a surface of the first alignment film on the pixel electrode and at an interface with the seal material, the second polyimide increases gradually in going to depth direction from the surface of the first alignment film in a cross sectional view.

16 Claims, 16 Drawing Sheets

A-A

|  | ALIGNMENT FILM (LAYER SEPARATION : EASY) | ALIGNMENT FILM (LAYER SEPARATION : NOT EASY) |
|---|---|---|
| ALIGNMENT ABILITY | ◎ | ○ |
| ADHESIVE STRENGTH | △ | ○ |

FIG. 16

| DRYING OF SOLVENT | ADHESIVE STRENGTH | ALIGNMENT ABILITY |
|---|---|---|
| QUICK | LOW | HIGH |
| SLOW | HIGH | LOW |

LIQUID CRYSTAL DISPLAY DEVICE

CLAIM OF PRIORITY

The present application claims priority from Japanese Patent Application JP 2020-160952 filed on Sep. 25, 2020, the content of which is hereby incorporated by reference into this application.

BACKGROUND OF THE INVENTION

(1) Field of the Invention

The present invention relates to a display device, specifically to a liquid crystal display device in which the alignment film has experienced photo alignment process.

(2) Description of the Related Art

The liquid crystal display device has a TFT substrate, in which the pixels, having pixel electrodes, TFTs (Thin film transistors) and so forth, are formed in matrix, the counter substrate opposing to the TFT substrate, and the liquid crystal sandwiched between the TFT substrate and the counter substrate. The images are formed by controlling the transmittance of light by liquid crystal molecules in each of the pixels.

The liquid crystal display device needs to make an initial alignment for the liquid crystal molecules by alignment film. The rubbing method has been used as an alignment method for the alignment film. The rubbing method has problems of generation of bright points due to shavings of the alignment film during the rubbing and break down between the wirings due to static electricity generated during the rubbing process. On the other hand, the photo alignment method, in which the uniaxial anisotropy is generated by cutting the polymer chains in the alignment film in certain direction with polarized ultra violet ray, does not have such problems of the rubbing method explained above.

In the meantime, the liquid crystal display device has a problem in viewing angle characteristic. The viewing angle characteristic is that the brightness or the color of the images are changed between when the screen is viewed in normal direction and when the screen is viewed in oblique direction. The IPS (In Plane Switching) type liquid crystal display device has a superior property in viewing angle characteristic. Since the IPS type does not need a so called pre-tilt angle, the photo alignment process is specifically suitable for the IPS type liquid crystal display device.

Patent document 1 discloses to suppress the after image in photo alignment method by using the alignment film which is formed from the polyamide acid ester as precursor. The patent document 2 discloses to use the polyamide acid ester and the polyamide acid as the material, and to form the first alignment film, which uses the polyamide acid ester as the precursor, and the second alignment film, which uses the polyamide acid as the precursor, in layered structure; and to suppress generation of the fine surface unevenness of the alignment film by making the weight average molecular weight of the polyamide acid smaller than the weight average molecular weight of the polyamide acid ester. Patent document 3 discloses to add a third polyimide element commonly to the upper polyimide film, which receives the photo alignment treatment, and to the lower polyimide film, which does not receive the photo alignment treatment. Patent document 4 discloses the liquid crystal display device, which uses negative type liquid crystal, having structure that a weight percent of the polyimide which does not receive photo alignment treatment is larger than a weight percent of the polyimide which receives photo alignment treatment in a total alignment film. Patent document 5 discloses a ratio of the polyimide which receives photo alignment treatment compared with the polyimide which does not receive photo alignment treatment is made smaller on the projection between the pixel electrodes than that on the area where the pixel electrode exists.

PRIOR TECHNICAL DOCUMENT

Patent Document

Patent document 1: Japanese patent application laid open No. 2009-288298
Patent document 2: WO 2011/115078
Patent document 3: Japanese patent application laid open No. 2016-80796
Patent document 4: Japanese patent application laid open No. 2016-66053
Patent document 5: Japanese patent application laid open No. 2012-185232

SUMMARY OF THE INVENTION

In the photo alignment process, the polymer chains in the polyimide film are cut in a certain direction by polarized ultra violet ray to give uniaxial anisotropy to the alignment film. This means the mechanical strength of the alignment film is decreased. In the meantime, the alignment effect to the liquid crystal molecules is mainly determined by upper most layer of the alignment film. Consequently, the alignment film can maintain mechanical strength in total by taking the structure such that: forming the upper layer, which contacts the liquid crystal molecules, by polyimide which receives photo alignment treatment and forming the lower layer by polyimide which does not receive photo alignment treatment.

By the way, the TFT substrate on which the TFT array and pixel electrodes and so forth are formed, and the counter substrate on which the color filter and so forth are formed, adhere to each other at their periphery through the seal material. The surface of the alignment film contacts the seal material. If the surface of the alignment film is decomposed by ultra violet ray, the adhering strength between the seal material and the alignment film decreases, thus, reliability of the liquid crystal display device becomes a problem.

The purpose of the present invention is simultaneously satisfying high alignment ability of the alignment film and high adherence strength between the alignment film and the seal material, thus, to realize a liquid crystal display device of superior display performance and high reliability.

The present invention solves the above explained problems; the concrete measures are as follows.

(1) A liquid crystal display device including a first substrate, having pixel electrodes and a first alignment film, and a second substrate adhere to each other by seal material, and the liquid crystal being sealed inside, in which the first alignment film is formed from a first polyimide, which receives a photo alignment treatment, and a second polyimide, which does not receive the photo alignment treatment, the first polyimide exists 75 to 98 weight % at a surface of the first alignment film on the pixel electrode and at an interface with the seal material, and the second polyimide increases gradually in going to depth direction from the surface of the first alignment film in a cross sectional view.

(2) The liquid crystal display device according to (1), in which, the first polyimide is formed from precursor of polyamide acid, which includes cyclobutane, the second polyimide is formed from precursor of polyamide acid, which does not include cyclobutane.

(3) The liquid crystal display device according to (1), in which, the first polyimide is formed from precursor of polyamide acid ester, which includes cyclobutane, the second polyimide is formed from precursor of polyamide acid, which does not include cyclobutane.

(4) A liquid crystal display device including a first substrate, having pixel electrodes and a first alignment film, and a second substrate adhere to each other by seal material, and the liquid crystal being sealed inside, in which the first alignment film is formed from a first polyimide, which receives a photo alignment treatment, and a second polyimide, which does not receive the photo alignment treatment, the first polyimide exists 75 to 98 weight % in a range of 10 nm from a surface in depth direction of the first alignment film on the pixel electrode and at an interface with the seal material, the second polyimide increases gradually in going to depth direction from the surface of the first alignment film in a cross sectional view, and dielectric anisotropy of the liquid crystal is positive.

BRIEF DESCRIPTION OF THE DRAWINGS

FIG. 16 is a summarized table that shows relations between the drying speed of the alignment film and the alignment ability of the alignment film and between drying speed of the alignment film and the adhesive strength of the alignment film with the seal material;

DETAILED DESCRIPTION OF THE PREFERRED EMBODIMENTS

The present invention is explained by the following embodiments in detail.

Embodiment 1

The present invention is applicable to general liquid crystal display devices which adopt a photo alignment method. Since IPS type liquid crystal display device does not need so called pre-tilt angle, the photo alignment method is suitable; consequently, the IPS type liquid crystal display devices adopt the photo alignment method in advance to other types of the liquid crystal display devices.

Figure 1:
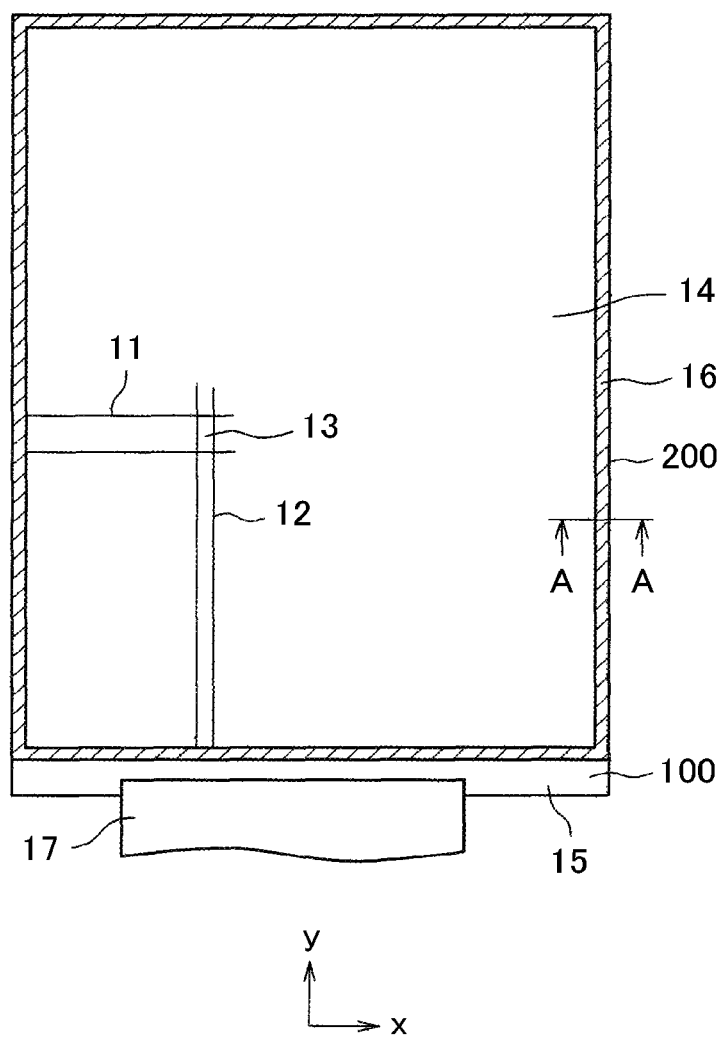
FIG. 1 is a plan view of a liquid crystal display device.

FIG. 1 is a plan view of the liquid crystal display device, to which the present invention is applied. In FIG. 1, the TFT substrate 100 and the counter substrate 200 adheres to each other at their periphery; the liquid crystal layer is sandwiched between the TFT substrate 100 and the counter substrate 200. The display area 14 is formed in the area TFT substrate 100 and the counter substrate 200 overlap.

In the display area 14 of the TFT substrate 100, the scan lines 11 extend in lateral direction (x direction) and are arranged in longitudinal direction (y direction); the video signal lines 12 extend in longitudinal direction and are arranged in lateral direction. The pixel 13 is formed in the area surrounded by the scan lines 11 and the video signal lines 12.

The TFT substrate 100 is made larger than the counter substrate 200; the terminal area 15 is formed in the area that the TFT substrate 100 does not overlap the counter substrate 200. The flexible wiring substrate 17 is connected to the terminal area 15. The driver IC which drives the liquid crystal display device is installed on the flexible wiring substrate 17.

Since the liquid crystal does not emit light, a back light is set at the rear side of the TFT substrate 100. The liquid crystal display panel forms images by controlling light from the back light in each of the pixels. The flexible wiring substrate 17 is folded back to the rear of the back light to make the outer size of the liquid crystal display device small.

Figure 2:
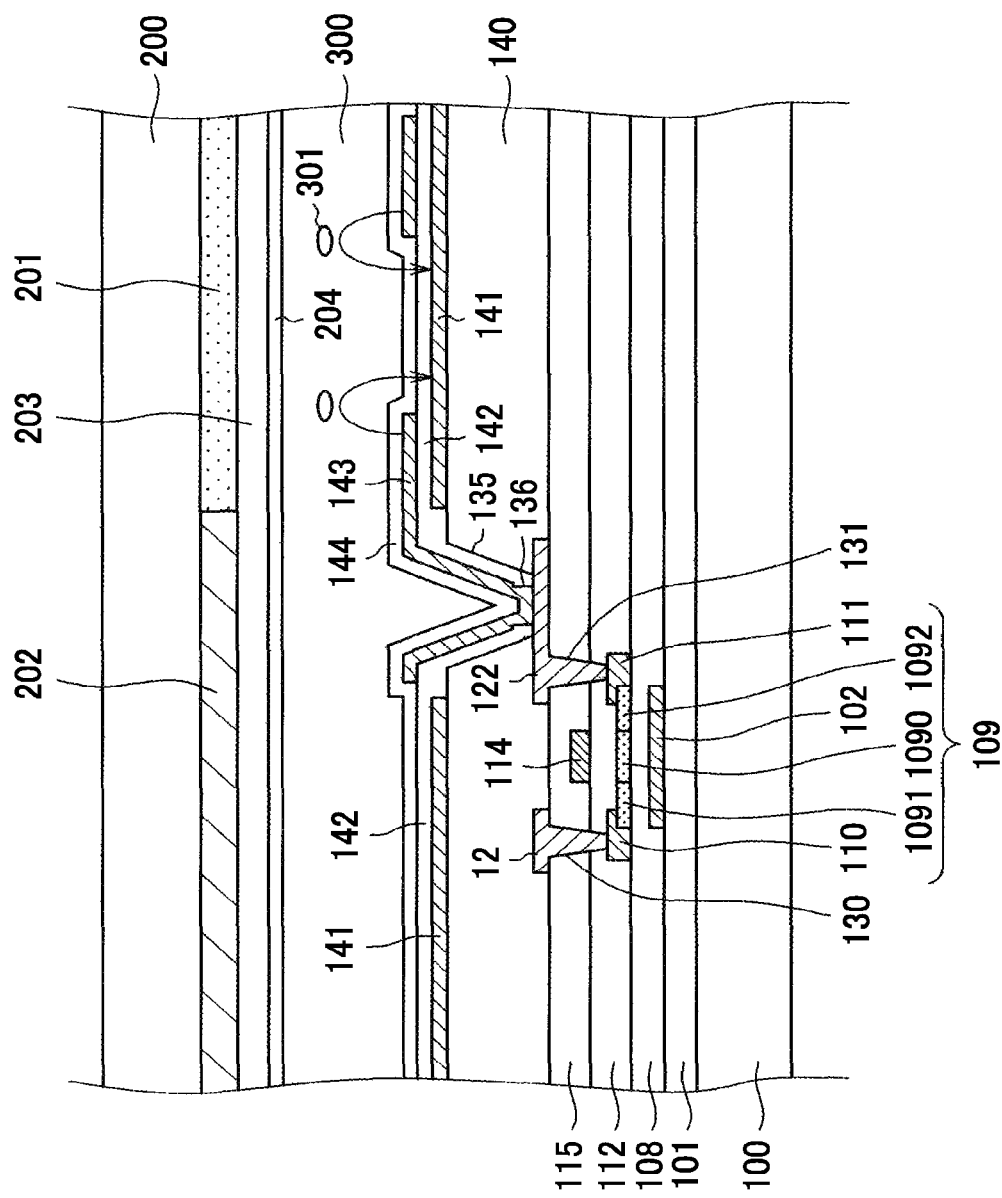
FIG. 2 is a cross sectional view of a display area of the liquid crystal display device.

FIG. 2 is a cross sectional view of the display device in which pixels are formed. FIG. 2 is the FFS (Fringe Field Switching) mode liquid crystal display device, which belongs to the IPS (In Plane Switching) type liquid crystal display device. The structure of FIG. 2 has the TFT which uses the oxide semiconductor film 109 (it may be called the oxide semiconductor TFT, herein after). Since the oxide semiconductor TFT is characterized by low leak current, it is suitable for the switching TFT.

In FIG. 2, the under coat film 101 is formed covering the TFT substrate 100. The under coat film 101 prevents the oxide semiconductor film 109 from being contaminated by the impurities intruding from the substrate formed from glass or resin, like polyimide and so forth. The under coat film 101 is often formed from a laminated layer of silicon oxide (SiO) film and the silicon nitride (SiN) film.

The light shading film 102 is made of metal and formed on the under coat film 101. The light shading film 102 can use the same metal as the gate electrode, which will be explained later, and so forth. The light shading film 102 prevents the channel of the TFT, which is formed later, from being irradiated by the light from the back light. The light shading film 102 can be used as the shield electrode to prevent the TFT from being influenced by a charge up of the substrate 100 if necessary. Further, the light shading film 102 can be used as a lower gate electrode by applying gate voltage.

The Buffer insulating film 108 is formed covering the light shading film 102. The buffer insulating film 108 is formed from silicon oxide film. The silicon oxide film is used to supply oxygen to the oxide semiconductor film 109, which is formed on upper layer, and to prevent the light shading film 102, which is made of metal, from depriving the oxide semiconductor film 109, which is formed on the upper layer, of oxygen.

In FIG. 2, the oxide semiconductor film 109, which constitutes the TFT, is formed on the buffer insulating film 108. The oxide semiconductor film 109 can be formed by sputtering. A thickness of the oxide semiconductor film 109 is 10 to 100 nm. In this embodiment, the oxide semiconductor film 109 is made of IGZO, and formed in a thickness of e.g. 50 nm.

The oxide semiconductor film 109 is constituted from channel region 1090, the drain region 1091 and the source region 1092. Conductivity is added to the drain region 1091 and the source region 1092 by ion implantation using the gate electrode 114 as the mask. The channel region 1090 is formed directly under the gate electrode 114.

The drain electrode 110 is overlapped on one terminal of the oxide semiconductor film 109; the source electrode 111 is overlapped on another terminal of the oxide semiconductor film 109. The drain electrode 110 and the source electrode 111 can be made of the same metal as the gate electrode 114 or they can be made of Ti (Titanium) film. Conductivity is given to the region of the oxide semiconductor film 109 which overlaps with the drain electrode 110 and the source electrode 111 since the metals extract oxygen from the oxide semiconductor film 109.

The gate insulating film 112 is formed from SiO covering the oxide semiconductor film 109, the drain electrode 110 and the source electrode 111. Since the gate insulating film 112 is made as an oxygen rich film, it supplies oxygen to the channel region 1090 to stabilize the characteristics of the oxide semiconductor film 109.

Figure 3:
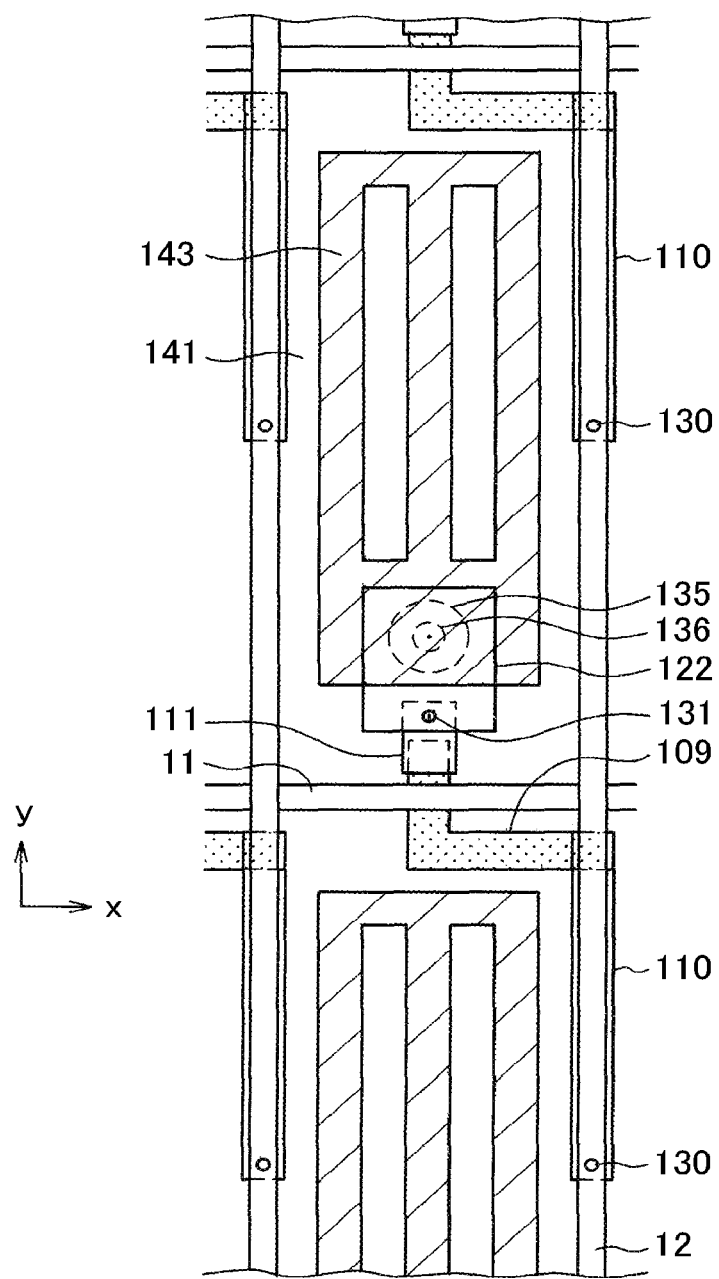
FIG. 3 is a plan view of a pixel of the liquid crystal display device.

The gate electrode 114 is formed on the gate insulating film 112. The gate electrode 114 is formed from e.g. a lamination film of Ti—Al—Ti (Titanium-Aluminum-Titanium) or MoW alloy film. As depicted in FIG. 3, in this embodiment, the scanning line 11 works as the gate electrode 114.

The interlayer insulating film 115 is formed covering the gate electrode 114. The interlayer insulating film 115 often has two layer structure of silicon oxide film and the silicon nitride film. The laminating order of the films depends on how the product is used and so forth.

In FIG. 2, the through hole 130 is formed in the interlayer insulating film 111 and the gate insulating film 112 to connects the video signal line 12 with the drain electrode 110; the through hole 131 is formed in the interlayer insulating film 111 and the gate insulating film 112 to connects the contact electrode 122 with the source electrode 111. The contact electrode 122 extends on the interlayer insulating film 115 to connect with the pixel electrode 143 via the through hole 135 and the through hole 136.

In FIG. 2, the organic passivation film 140 is formed covering the interlayer insulating film 115. The organic passivation film 140 is formed from e.g. acrylic resin. The organic passivation film 140 is made thick as 2 to 4 microns to work as a flattening film and to decrease a floating capacitance between the video signal line 12 and the common electrode 141. The through hole 135 is formed in the organic passivation film 140 to connect the contact electrode 122 with the pixel electrode 114.

The common electrode 141 is formed from the transparent conductive film as e.g. ITO (Indium Tin Oxide) on the organic passivation film 140. The common electrode 141 is formed in planar shape. The capacitance insulating film 142 is formed from the silicon nitride film covering the common electrode 141. The pixel electrode 143 is formed from the transparent conductive film as e.g. ITO on the capacitance insulating film 142. The pixel electrode 143 is patterned as comb shape. The capacitance insulating film 142 is so called because it forms a pixel capacitance between the common electrode 141 and the pixel electrode 143.

The alignment film 144 is formed covering the pixel electrode 143. The alignment film 144 is also formed on the capacitance insulating film 142 over the common electrode 141 and between the pixel electrodes 143. The alignment film 144 determines intimal alignment direction of the liquid crystal molecules 301. The photo alignment method, which uses polarized ultra violet ray, is adopted in this embodiment. The photo alignment method is suitable for the IPS type liquid crystal display device because the IPS type does not need a pre-tilt angle.

In FIG. 2, the counter substrate 200 is disposed opposing to the TFT substrate 100 sandwiching the liquid crystal layer 300. The color filter 201 and the black matrix 202 are formed on the counter substrate 200; the over coat film 203 is formed on the color filter 201 and the black matrix 202. The alignment film 204 is formed on the over coat film 203. The effect of the alignment film 204 and the alignment treatment for the alignment film 204 are the same as that of the alignment film 144 formed on the TFT substrate 100.

In FIG. 2, when a voltage is applied between the common electrode 141 and the pixel electrode 143, lines of forces as depicted in FIG. 2 are formed to rotate the liquid crystal molecules 301, thus, a transmittance of the light from the back light is controlled by the liquid crystal layer 300. The images are formed by controlling the transmittance of the light in each of the pixels.

FIG. 3 is a plan view of the pixel in the display area of the liquid crystal display device corresponding to FIG. 2. In FIG. 3, the scanning lines 11 extend in lateral direction (x direction) and are arranged in longitudinal direction (y direction); the video signal lines 12 extend in longitudinal direction and are arranged in lateral direction. The pixel electrode 143 is formed in the area surrounded by the scanning lines 11 and the video signal lines 12. The oxide semiconductor TFT is formed between the video signal line 12 and the pixel electrode 143. In the meantime, the light shading film is omitted in FIG. 3.

In FIG. 3, the drain electrode 110 connects with the video signal line 12 via the through hole 130; the drain electrode 110 extends under the video signal line 12 toward the oxide semiconductor TFT of the adjacent upper side pixel. The oxide semiconductor film 109 extends in L shape; one terminal of the oxide semiconductor film 109 connects with the drain electrode 110 in superposing manner.

The channel of the TFT is formed at the region where the oxide semiconductor film 109 passes under the scanning line 11. In FIG. 3, the scanning line 11 works as the gate electrode 114. The oxide semiconductor film 109 is given conductivity by doping Boron (B) through the ion implantation except the channel region under the gate electrode 114, namely, under the scanning line 11.

Another terminal of the oxide semiconductor film 109 connects with the source electrode 111 in superposing manner. The source electrode 111 extends toward the pixel electrode 143, and connects with the contact electrode 122 via the through hole 131. The contact electrode 122 connects with the pixel electrode 143 via the through hole 135 formed in the organic passivation film 140 and the through hole 136 formed in the capacitance electrode 142. The pixel electrode 143 is formed in comb shape.

The common electrode 141 is formed in planar shape under the pixel electrode 143. When a voltage is applied to the pixel electrode 143, as explained in FIG. 2, the lines of forces are generated between the pixel electrode 143 and the common electrode 141 to rotate the liquid crystal molecules 301, thus, a transmittance of each of the pixels is controlled.

Figure 4:
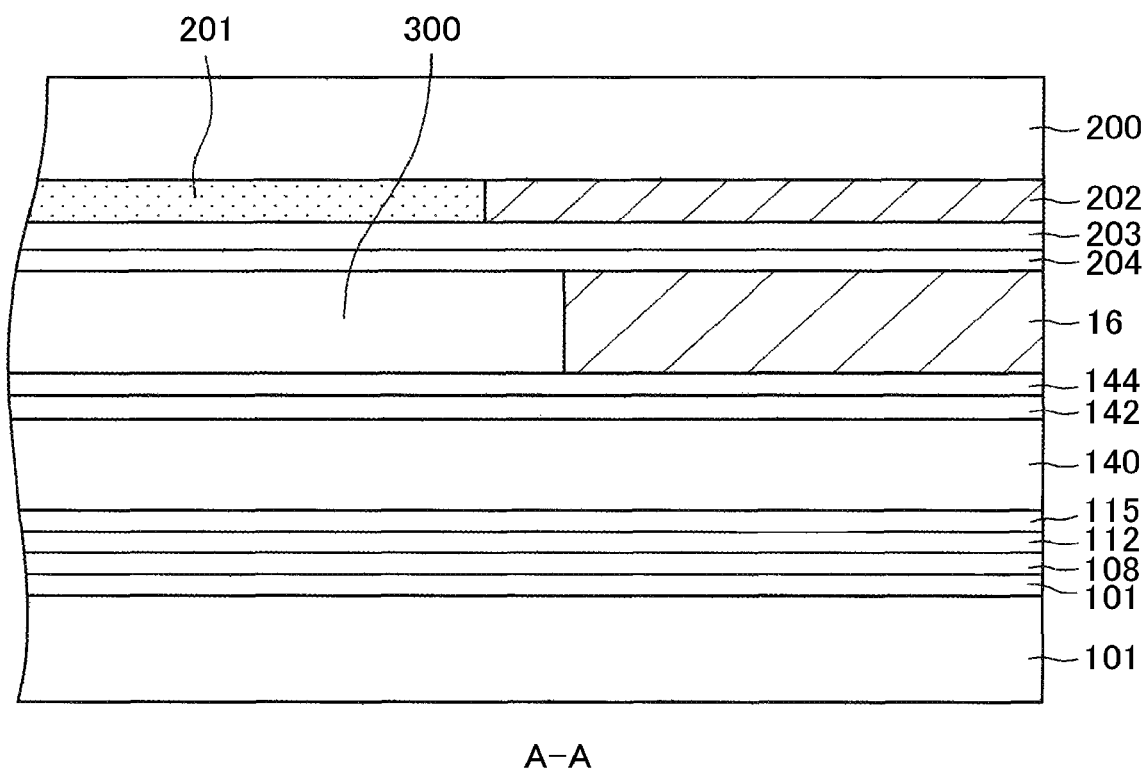
FIG. 4 is a cross sectional view of FIG. 1 along the line A-A.

FIG. 4 is a cross sectional view at the seal area corresponding to the line A-A in FIG. 1. The layer structure in FIG. 4 is the same as explained in FIG. 2. In FIG. 4, the TFT substrate 100 and the counter substrate 200 adhere to each other via seal material 16 formed between the alignment film 144 of the TFT substrate 100 and the alignment film 204 of the counter substrate 200.

The alignment film 144 and the alignment film 204 have important roles to align the liquid crystal molecules 301 in the display area and to maintain adhering strength with the seal material 16 in the seal area. Herein after, the alignment film 114 of the TFT substrate 100 represents the alignment films. In most cases, polyimide is used for the alignment film.

The polyimide in this specification is a polymer compound defined by (chemical formula 1), where inside of the bracket [ ] is a repeating chemical structure, and notation n is a number of repetition. N is nitrogen atom, O is oxygen atom, A is a tetravalent organic group, D is a divalent organic group. Examples of the structure A are: aromatic cyclic compounds as phenylen, naphthalene, antracene ring and so forth or other compounds that constituents are added to those aromatic cyclic compounds. Examples of the structure D are: aromatic cyclic compounds as phenylene, biphenylene, oxiphenylene, biphenylene amine, naphthalene, antracen, and so forth or other compounds that constituents are added to those aromatic cyclic compounds. Those polyimde are coated as precursors on the layer formed on the substrate.

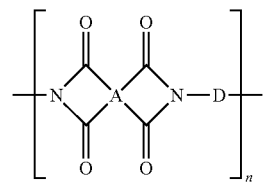

Chemical formula 1

Unlike the rubbing method, the photo alignment film receives photo alignment treatment as far as the ultra violet ray penetrates. That is to say, if the material of the alignment film is photo decomposable type, the mechanical strength of the alignment film is weakened because the alignment film decomposes due to the ultraviolet ray. The weak mechanical strength of the alignment film causes unstable in intimal alignment of the liquid crystal molecules as generating after images and so forth.

In order to counter measure this problem, a two layer structure for the alignment film has been developed; the two layer structure includes an alignment film which receives photo alignment treatment, and an alignment film which does not receive photo alignment treatment. Such an alignment film of two layers can be formed by coating the mixture containing precursors as polyamide acid ester defined by chemical formula 2 and as polyamide acid defined by chemical formula 3.

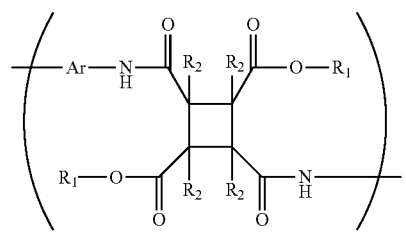

Chemical formula 2

In chemical formula 2, $R_1$ is independently, alkyl group of carbon number 1 to 8; $R_2$ is independently, hydrogen atom, fluorine atom, chlorine atom, bromine atom, phenyl group, alkyl group of carbon number 1 to 6, alkoxy group of carbon number 1 to 6, vinyl group ($-(CH2)m-CH=CH2$, m=0, 1, 2), or acetyl group ($-(CH2)m-C\equiv CH$, m=1, 1, 2) and Ar is aromatic compounds.

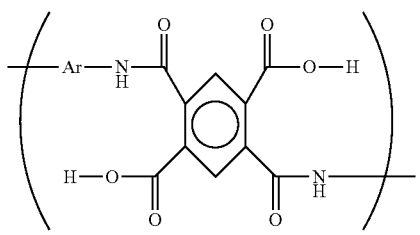

Chemical formula 3

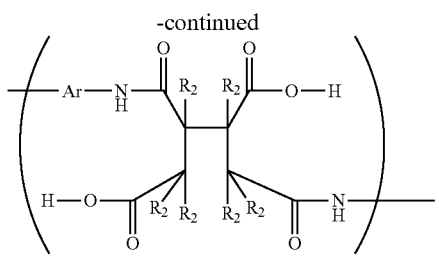

In chemical formula 3, R2 is independently, alkyl group of carbon number 1 to 8; R2 is independently, hydrogen atom, fluorine atom, chlorine atom, bromine atom, phenyl group, alkyl group of carbon number 1 to 6, alkoxy group of carbon number 1 to 6, vinyl group (—(CH2)m-CH═CH2, m=0, 1, 2), or acetyl group (—(CH2)m-C≡CH, m=1, 1, 2) and Ar is aromatic compounds.

Unlike chemical formula 2, chemical formula 3 does not contain cyclobutane. Since the structure of chemical formula 3 does not contain cyclobutane, it is not influenced by ultraviolet ray. Other difference of chemical formula 3 from chemical formula 2 is that R1 in chemical formula 2 is substituted by H in chemical formula 3.

When the alignment film material, which is a mixture of the substance of chemical formula 2 and the substance of chemical formula 3, is coated, a layer separation occurs, namely: an upper alignment layer 1441 having polyimide 21, which is formed from polyamide acid ester as a precursor and receives photo alignment treatment, and a lower alignment layer 1442 having polyimide 22, which is formed from polyamide acid as a precursor and does not receive photo alignment treatment.

Figure 5:
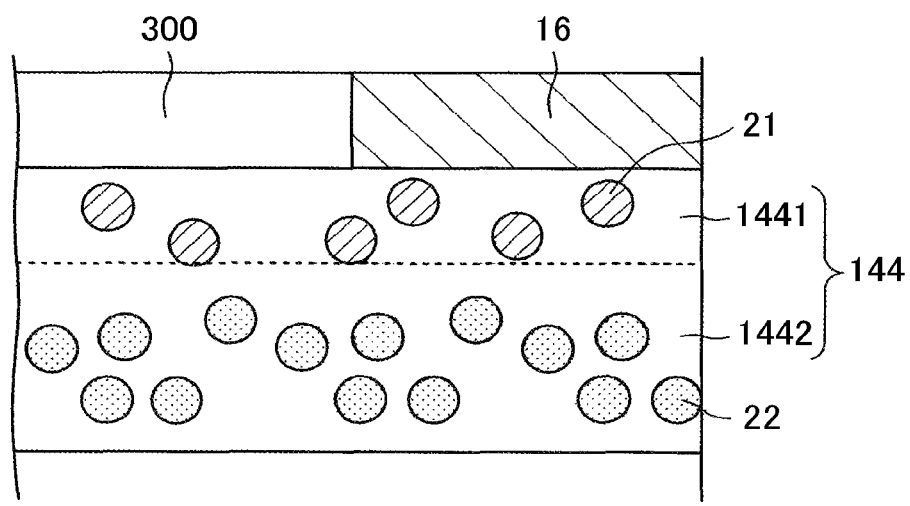
FIG. 5 is a cross sectional view of an alignment film which has a layer separation.

FIG. 5 is a cross sectional view of the alignment film 144 formed by the above explained process. In FIG. 5, the alignment film 144 is separated to the upper layer 1441, which receives the photo alignment treatment, and the lower layer 1442, which does not receive the photo alignment treatment. The circle marks in the upper layer 1441 mean polymer 21, which is formed from e.g. polyamide acid ester of chemical formula 2; the circle marks in the lower layer 1442 mean polymer 22, which is formed from e.g. polyamide acid of chemical formula 3.

FIG. 5 is a state where the upper layer 1441 and the lower layer 1442 are rather clearly separated. The upper layer 1441, which receives photo alignment treatment, contacts the liquid crystal layer 300 and the seal material 16. Since the surface of the alignment film 144 is formed from the photo alignment film 1441 having received photo alignment treatment, the alignment ability in the display area is superior. In the photo decomposable alignment film, however, since the molecule structures are decomposed by the polarized ultra violet ray, the strength of the film is weakened. Therefore, it has a problem that adhering strength between the seal material 16 and the alignment film 144 is not enough in the seal area.

The alignment film 144 uses polyamide acid ester as defined by chemical formula 2 for the layer that receives photo alignment treatment, and uses polyamide acid as defined by chemical formula 3 for the layer that does not receive photo alignment treatment. Since polyamide acid has higher polarity (surface energy is high) than that of polyamide acid ester, it has more affinity with the under coat layer of an ITO film or a capacitance insulating film, consequently, the layer of polyamide acid tends to be separated from the layer of polyamide acid ester.

Figure 6:
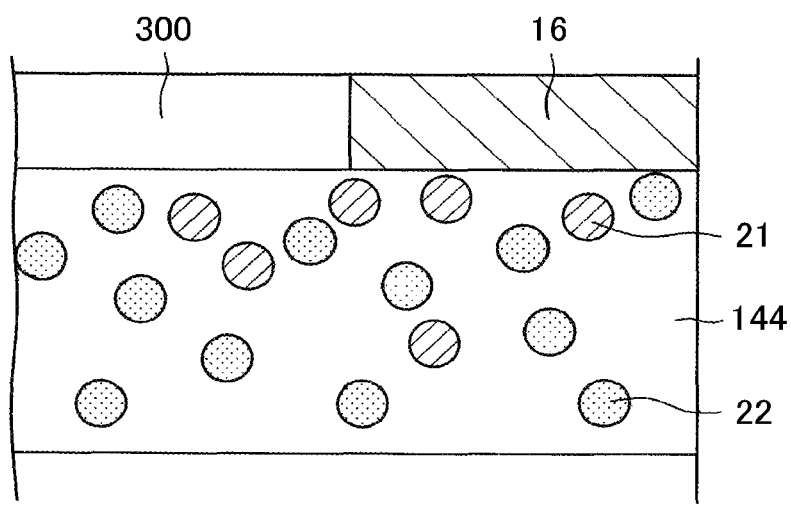
FIG. 6 is a cross sectional view of the alignment film which does not have a layer separation.

FIG. 6 is a cross sectional view of another alignment film 144. In FIG. 6, the layer that receives the photo alignment treatment and the layer that does not receive the photo alignment treatment are not clearly separated. However, the ratio of the polyimide 21, which receives the photo alignment treatment, is higher than the polyimide 22, which does not receive the photo alignment treatment, at the surface of the alignment film 144. The ratio of the polyimide 22, which does not receive the photo alignment treatment, becomes larger in going in the depth direction of the alignment film 144.

The polyimide 21, which receives photo alignment treatment, in the structure of FIG. 6, polyamide acid as defined by chemical formula 4, which contain cyclobutane, can be used.

Chemical formula 4

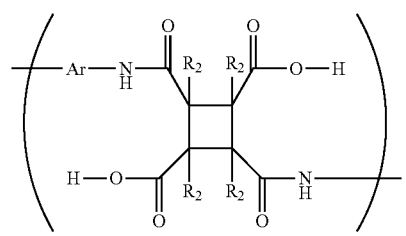

In chemical formula 4, R2 is independently, hydrogen atom, fluorine atom, chlorine atom, bromine atom, phenyl group, alkyl group of carbon number 1 to 6, alkoxy group of carbon number 1 to 6, vinyl group (—(CH2)m-CH═CH2, m=0, 1, 2), or acetyl group (—(CH2)m-C≡CH, m=1, 1, 2) and Ar is aromatic compounds. That is to say, chemical formula 4 differs from chemical formula 2 in that R1 in chemical formula 2 is substituted by hydrogen in chemical formula 4.

Since both the structures of chemical formula 3 and chemical formula 4 are polyamide acid, a difference in surface energy between the structure of chemical formula 3 and the structure of chemical formula 4 is smaller than a difference in surface energy between the polyamide acid ester of chemical formula 2 and the polyamide acid of chemical formula 3; therefore, a clear layer separation does not easily occur by coating a mixture of the substance of chemical formula 3 and the substance of chemical formula 4. Both the substance of chemical formula 3 and the substance of chemical formula 4 are polyamide acid; therefore, an additive to change the surface free energy can be added to one of the substance of chemical formula 3 and the substance of chemical formula 4 so that the substance of chemical formula 4 exists more at the surface of the alignment film 144. By the way, chemical formula 3 and chemical formula 4 are just examples; polyamide acid of other structure also can be adopted.

In the meantime, even polyamide acid, which contains cyclobutane, is used as a precursor, 100% of the precursor is not always consists of this polyamide acid. The content of the polyamide acid, which contains cyclobutane, can be 80% or more; adding the polymer that can increase number average molecular weight for the residual 20% or less in the precursor can make the alignment film that the polyamide acid containing cyclobutane distributes more in the upper layer.

The substance having larger number average molecular weight tends to distribute in the upper layer, therefore, adding an additive that can increase imidization rate to the polyamide acid having cyclo butane enables the polyamide acid that contains cyclobutane to distribute more in the upper layer than the polyamide acid that does not contain cyclobunatane. Consequently, a deterioration in alignment ability of the alignment film can be avoided. For example, controlling the imidization rate of the polyamide acid, which contains cycobutane, 70% or more, preferably 80% or more, and controlling the imidization rate of the polyamide acid, which does not contain cycobutane, 50% or less can make the polyamide acid that receives photo alignment treatment distribute more in the upper layer in the alignment film in which polyamide acid is used as precursor.

Figures 7, 8:
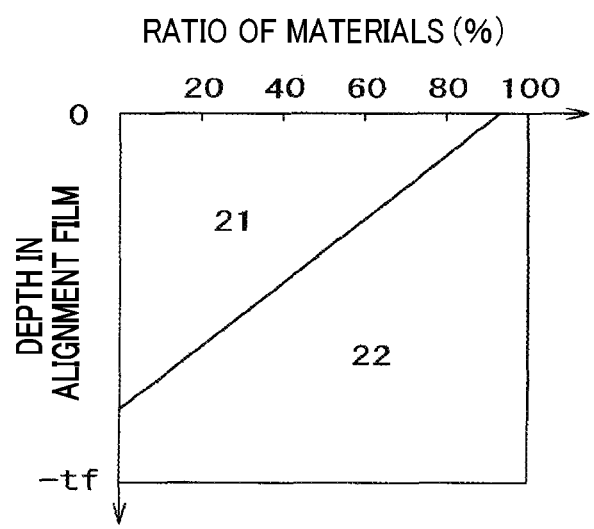
FIG. 7 is an evaluation result of alignment ability of the alignment film and adhesive strength between the alignment film and a seal material.
FIG. 8 is a graph that shows a ratio of amount between the polyimide, which receives photo alignment treatment, and the polyimide, which does not receive photo alignment treatment, in a depth direction of the alignment film.

FIG. 7 is a table that qualitatively compares in alignment ability for the liquid crystal molecules and adhesive strength with the seal material between the alignment film that the layer separation easily occurs as exemplified in FIG. 5 and the alignment film that the layer separation does not easily occur as exemplified in FIG. 6. In the table, ⊚ means excellent, ○ means allowable and Δ means having problems. As shown in FIG. 7, when the material that easily generates the layer separation is used, the alignment ability is good, however, adhesion with the seal material is problematic. On the other hand, when the material that does not easily generate the layer separation is used, the alignment ability is allowable, however, adhesion with the seal material can be made allowable in good probability. FIG. 7, however, only shows general tendency; even a combination of materials for the polyimide that receives photo alignment treatment and the polyimide that does not receive the photo alignment treatment are the same, as explained later, the alignment ability and adhesion strength with the seal material are changed according to species of material or amount of combination, drying temperature, and kinds of solvents.

FIG. 8 is a graph that shows a ratio of polyimide 21, which receives photo alignment treatment, and polyimide 22, which does not receive photo alignment treatment, in depth direction of the alignment film. In FIG. 8, the abscissa is a ratio (%) of the polyimide 21 that receives photo alignment treatment and the ordinate is a depth from the surface of the alignment film. In the ordinate of FIG. 8, 0 is the surface of the alignment film and tf is a thickness of the alignment film. In FIG. 8, a ratio of the polyimide 21, which receives photo alignment treatment, is 94% at the surface of the alignment film; the ratio of the polyimide 21, which receives photo alignment treatment, decreases gradually in going to depth direction in the alignment film. FIG. 8 shows that a clear layer separation in the alignment film is not formed.

The ratio of the materials in the alignment film is compared by weight percent between the polyimide 21, which receives photo alignment treatment, and the polyimide 22, which does not receive photo alignment treatment. For example, the measuring is conducted as that: the molecules of the polyimide 21, which receives photo alignment treatment, and the molecules of the polyimide 22, which does not receive photo alignment treatment, are determined at certain depth in the alignment film, and then, the numbers of molecules are compared.

When weight percent is measured in the analysis, a certain amount of thickness of the alignment film is necessary. The alignment of the liquid crystal molecules is influenced by the structure of the alignment film until 10 nm depth from the surface. Correspondingly, when the weight percent is measured, the above explained ratio can be defined as the weight percent in 10 nm thickness of the alignment film at each of the points from the surface of the alignment film.

In FIG. 8, the polyimide, which does not receive photo alignment treatment, partly exists at the surface of the polyimide film. That is to say, this portion cannot align the liquid crystal molecules. However, the polyimide, which does not receive photo alignment treatment, does not concentrate in a certain region of the surface of the alignment film, but is scattered over the surface of the alignment film. The liquid crystal has elasticity, thus, the display unevenness does not always occur even some small regions that do not align the liquid crystal molecules exist.

The display unevenness is generated when a ratio of the polyimide 22, which does not receive photo alignment treatment, is increased. The ratio of the polyimide 21, which receives photo alignment treatment, at the surface of the alignment film is 75 to 98 weight percent to obtain the condition that the display unevenness does not occur and the enough adhesive strength between the alignment film and the seal material can be secured; more preferably, the ratio of the polyimide 21 is 75 to 85 weight percent. In other words, the ratio of the polyimide 21, which receives photo alignment treatment, in a range within 10 nm from the surface of the alignment film is 75 to 98 weight percent or preferably 75 to 85 weight percent.

By the way, if unevenness exists at the surface on which the polyimide is coated, there is a chance that content of the alignment film material changes due to levelling effect. The above explained ratio of the polyimide 21, which receives the photo alignment treatment, is defined as the value on the pixel electrode or at the interface at which the alignment film contacts the seal material. In the meantime, on the counter substrate 200, the above explained ratio of the polyimide 21, which receives the photo alignment treatment, is defined as the value on the color filter, which counters the pixel electrode, or at the interface at which the alignment film contacts the seal material.

Even a combination of kinds of the materials is the same, the structure of the alignment film at the surface and its vicinity is influenced by the ratio between the precursor for the polyimide 21, which receives photo alignment treatment, and the precursor for the polyimide 22, which does not receive photo alignment treatment. In the structure of FIG. 8, the amount of the polyimide 21, which receives photo alignment treatment, is 40% of the amount of total alignment film.

In the meantime, the polyamide acid ester is used for the polyimide 21, which receives photo alignment treatment, and the polyamide acid is used for the polyimide 22, which does not receive photo alignment treatment in FIG. 5, on the other hand, the polyamide acid is used for both the polyimide 21, which receives photo alignment treatment, and the polyimide 22, which does not receive photo alignment treatment in FIG. 6. However, it is only an example. It does not mean that only the combination of the above materials attains the structures of FIG. 5 and FIG. 6. That is to say, the structure of the alignment film is changed according to weight percent of the materials, drying temperature, drying speed, solvent and so forth even a combination of the materials is the same.

There are several evaluation methods of the alignment film; one method is to evaluate by display unevenness. Since the alignment film aligns the liquid crystal molecules, the evaluation is influenced by the kind the liquid crystal whether display unevenness appears or not. There are two kinds of liquid crystal materials; namely, the dielectric anisotropy Δε is positive, and the dielectric anisotropy Δε is negative. The liquid crystal of negative dielectric anisotropy has a merit that disclination is not easily generated, however, has a demerit there could be a chance that a decrease in electrical resistance occurs.

Figure 9:
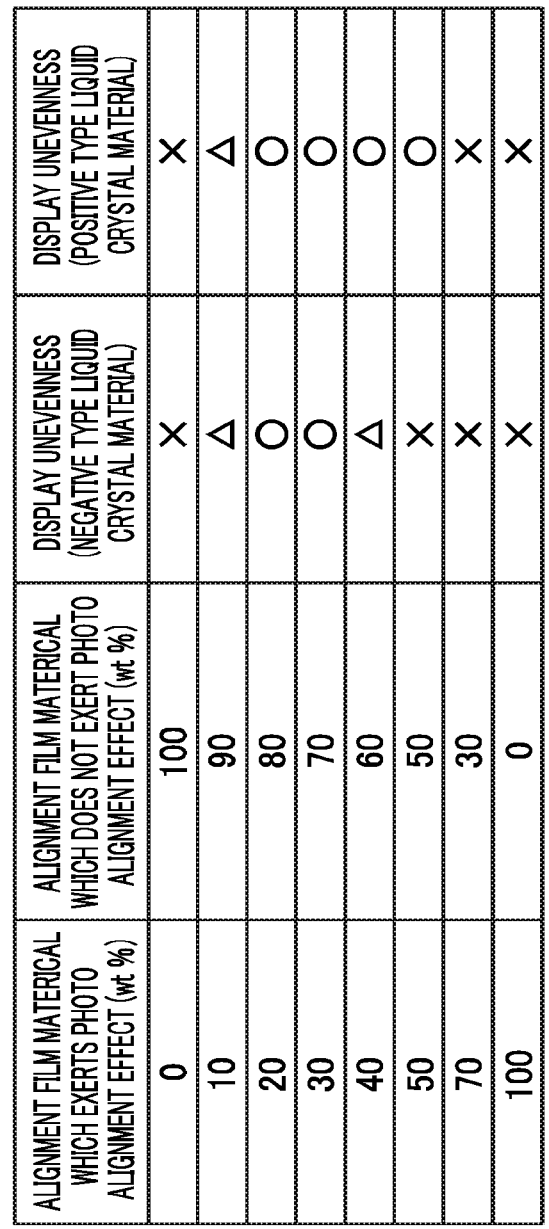
FIG. 9 is a table that shows a relation between the ratio of the polyimide, which receives photo alignment treatment and the polyimide, which does not receive the photo alignment treatment, and display unevenness.

FIG. 9 is a table that the generation of the display unevenness is evaluated between the liquid crystal of the dielectric anisotropy is positive and the liquid crystal of the dielectric anisotropy is negative when a ratio of the polyimide, which receives the photo alignment treatment, and the polyimide, which does not receive the photo alignment treatment, is changed. When a ratio of the polyimide, which receives the photo alignment treatment, decreases, display unevenness tends to occur in both the liquid crystal of the dielectric anisotropy is positive (herein after the positive type liquid crystal) and the liquid crystal of the dielectric anisotropy is negative (herein after the negative type liquid crystal).

On the other hand, according to an increase in the ratio of the alignment film that receives the photo alignment treatment, a difference in probability of display unevenness occurs between the case of negative type liquid crystal and the case of positive type liquid crystal; probability of appearing of display unevenness is larger in negative type liquid crystal. The difference is supposed to be due to a generation of difference in resistivity between the positive type liquid crystal and the negative type liquid crystal. The polyimide, which receives photo alignment treatment, is decomposed by the polarized ultra violet ray; the existence of the residue decreases the resistivity of the liquid crystal. Since the negative type liquid crystal tends to accommodate the residue more, the resistivity of the liquid crystal decreases; thus, the display unevenness appears.

In any events, since only the surface of the polyimide, which contacts the liquid crystal molecules, contributes to the alignment of the liquid crystal molecules, the polyimide, which receives the photo alignment treatment, needs to exist only at the surface of the alignment film. Therefore, the polyimide, which does not receive photo alignment treatment, is preferably more in the alignment film except at the surface to maintain mechanical strength of the alignment film, and thus, alignment ability can be stabilized. Therefore, ratio of the polyimide, which receives the photo alignment treatment, is preferably less than 50% and 10% or more.

Figure 10:
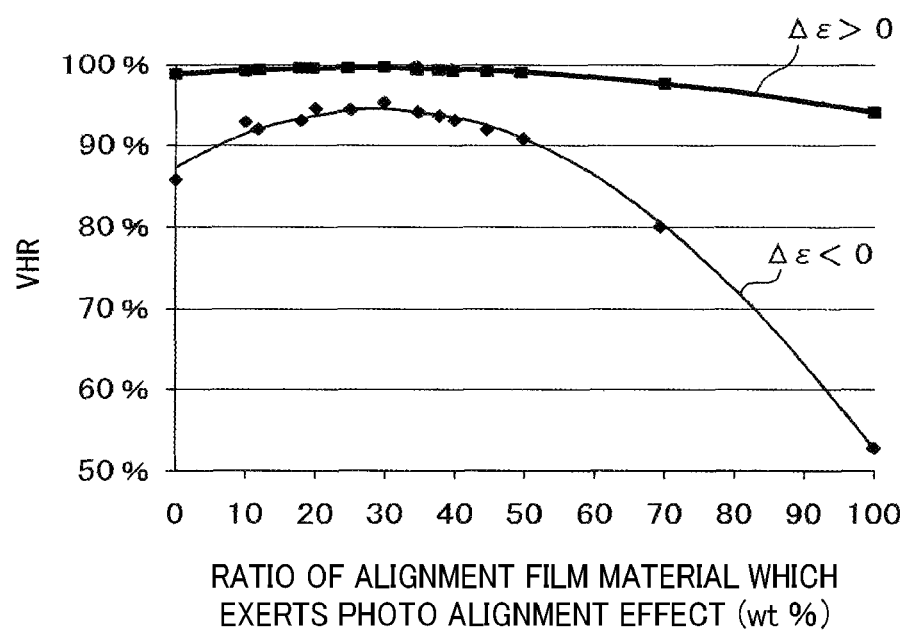
FIG. 10 is a graph that shows a relation between the material of the alignment film and voltage holding ratio for the liquid crystal of positive dielectric anisotropy and of the liquid crystal of negative dielectric anisotropy.
Figure 11:
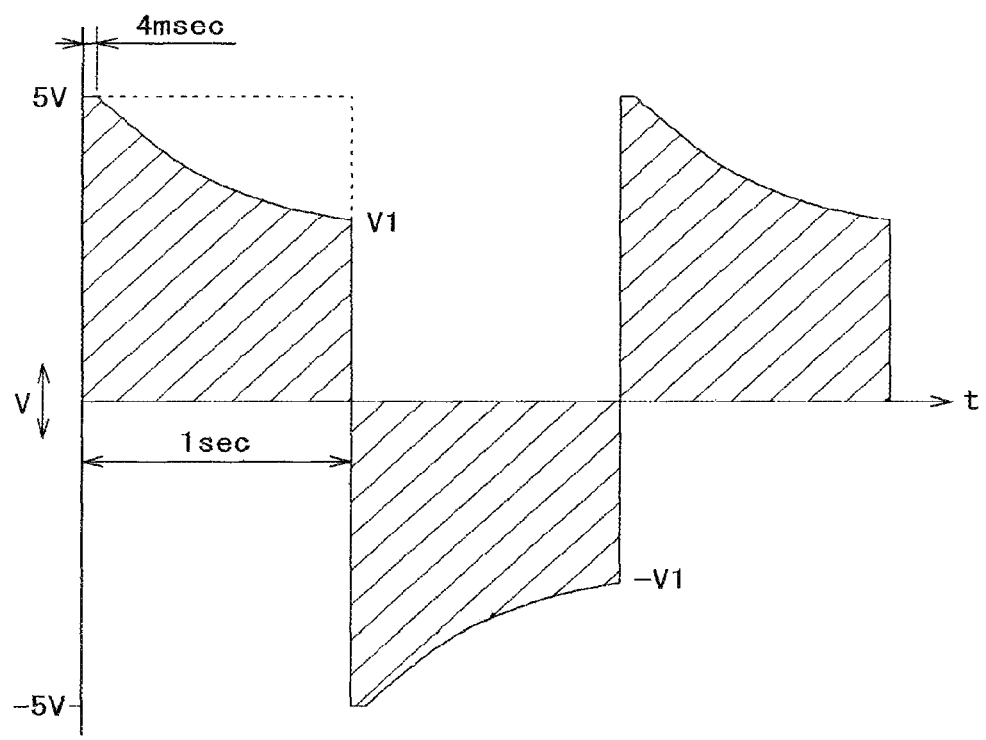
FIG. 11 is a definition of the voltage holding ratio.

FIG. 10 is a graph that shows the above explained phenomenon. In FIG. 10, the abscissa is the ratio of the polyimide film material which exerts the photo alignment effect; the ordinate is voltage holding ratio (VHR Voltage Holding Ratio). The definition of VHR is shown in FIG. 11. In FIG. 11, the abscissa is time, and the ordinate is a voltage of the pixel electrode. FIG. 11 is a graph that shows 5 V is applied to the pixel electrode depicted in FIG. 2 for 4 millisecond, and then how the voltage of the pixel electrode changes. The pixel voltage after 1 second is V1. The voltage holding ratio is defined by a ratio between the hatching area defined by solid line and the rectangle area defined by solid line and dotted line.

The intermittent drive can be possible if voltage holding ratio is high, consequently, power consumption in the liquid crystal display device can be saved. On the other hand, the ratio of the polyimide, which receives photo alignment treatment, can be increased in combination of the alignment film materials by using positive type liquid crystal. That is to say, a liberty can be secured in attaining the desired layer structure of the alignment film.

Figure 12:
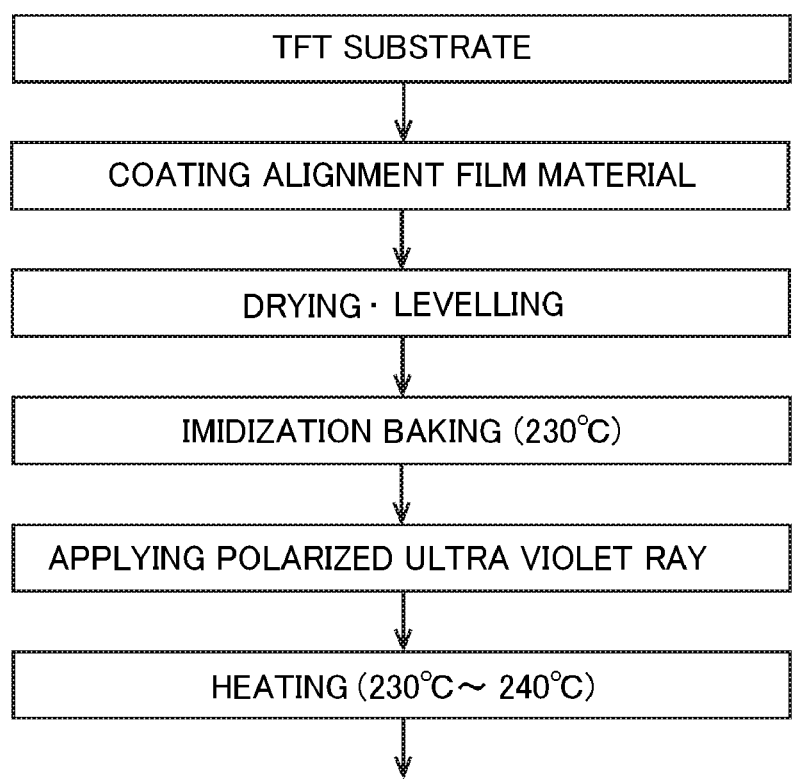
FIG. 12 is a flow chart for manufacturing the alignment film.

FIG. 12 is a flow chart to form the photo alignment film of photo decomposing type. The material for the alignment film is that the precursor of the polyimide, which receives photo alignment treatment, and the precursor of the polyimide, which does not receive photo alignment treatment, are solved in the solvent. The solvent is explained later. In FIG. 12, the alignment film is coated on the display area including the pixel electrode and the capacitance electrode and so forth, and the seal area of the TFT substrate. The coating can be performed by flexographic printing or by inkjet and so forth.

After that, the TFT substrate is put into the drying furnace to disperse the solvent and to perform levelling. The layer separation occurs in this drying and levelling. The layer separation in this invention includes not only a clear layer separation depicted in FIG. 5 but also a layer separation depicted in FIG. 6. After that, the alignment film is imidized by baking at 230 degrees C. Then, polarized ultra violet ray is applied to the alignment film to give uniaxial anisotropy. In the case of so called photo decomposing type photo alignment film, the polarized ultraviolet ray of wavelength of 254 nm is applied at an intensity of 1000 $mJ/cm^2$ to the alignment film to give alignment ability. After that, the alignment film is baked at 230 to 240 degree C. to evaporate monomers and oligomers which are generated during irradiation of the ultra violet ray. FIG. 12 is a process for the alignment film on the TFT substrate, however, the process is the same for the alignment film on the counter substrate.

Figure 13:
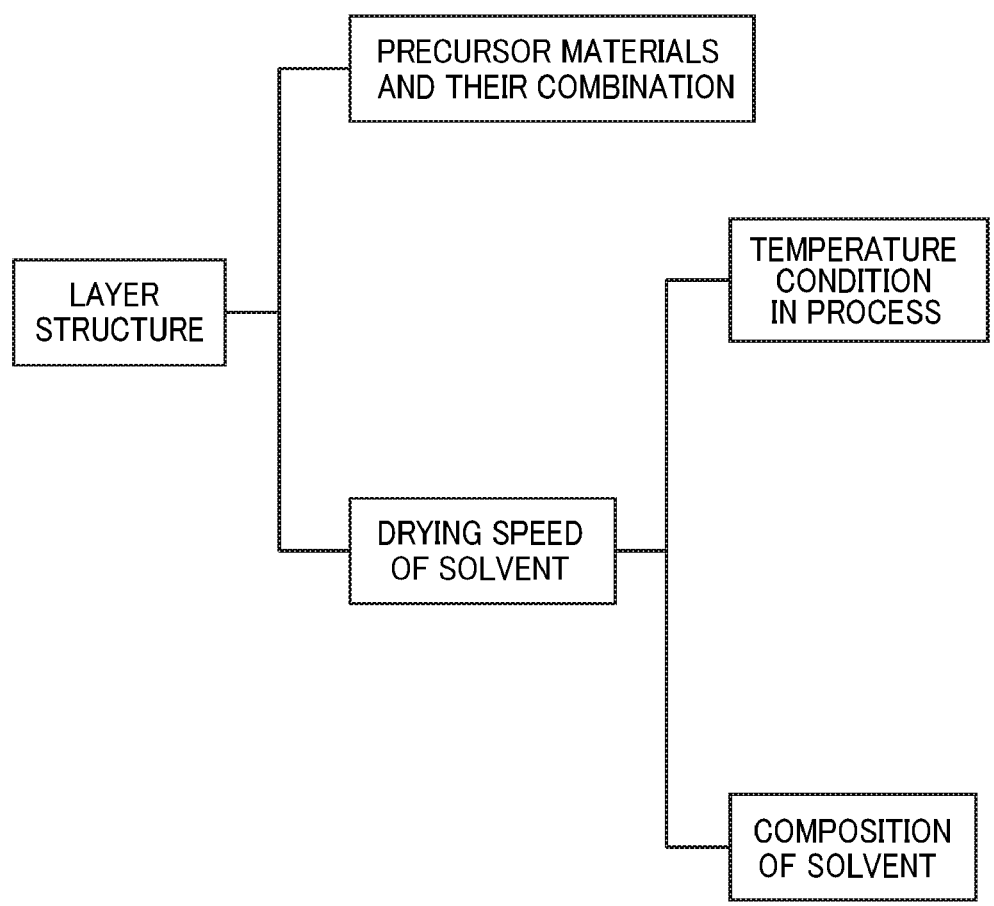
FIG. 13 is a chart that shows elements, which influence the structure of the alignment film.

FIG. 13 shows elements that determine the structure of the alignment film including the polyimide, which receives photo alignment treatment, and the polyimide, which does not receive photo alignment treatment. The material for the alignment film is that the precursor of the polyimide, which receives photo alignment treatment, and the precursor of the polyimide, which does not receive photo alignment treatment, are solved in the solvent. The layer structure of the alignment film is influenced by two precursors that constitute the polyimide and their ratio (weight %). The inventors, however, found that drying speed of the solvent in the alignment film material influences to the layer structure of the alignment film.

Figure 14:
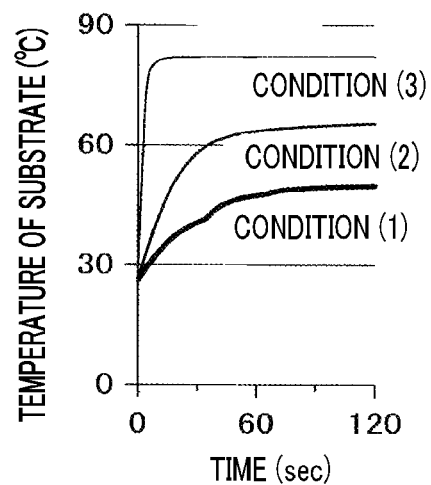
FIG. 14 is examples of temperature profiles in a drying process of the polyimide film.

As shown in FIG. 13, drying speed of the solvent can be controlled by temperature condition in the process and composition of the solvent. The temperature condition in the process concretely means the temperature of the drying furnace. FIG. 14 is a graph of a drying condition of the substrate, on which the alignment film material is coated. In FIG. 14, the abscissa is time for drying and the ordinate is temperature of the substrate.

In FIG. 14, the temperature of the furnace becomes higher according to the order of condition (1), condition (2) and condition (3). The temperature of the furnace is higher, the quicker is the drying time; namely, the solvent evaporates quicker. If the drying is quick, the structure is fixed before realignment of the precursor of the alignment film is completed; on the contrary, if the drying takes a long time, the realignment of the precursor of the alignment film can be performed thoroughly. That is to say, the structure of the alignment film becomes different according to the drying condition.

Figure 15:
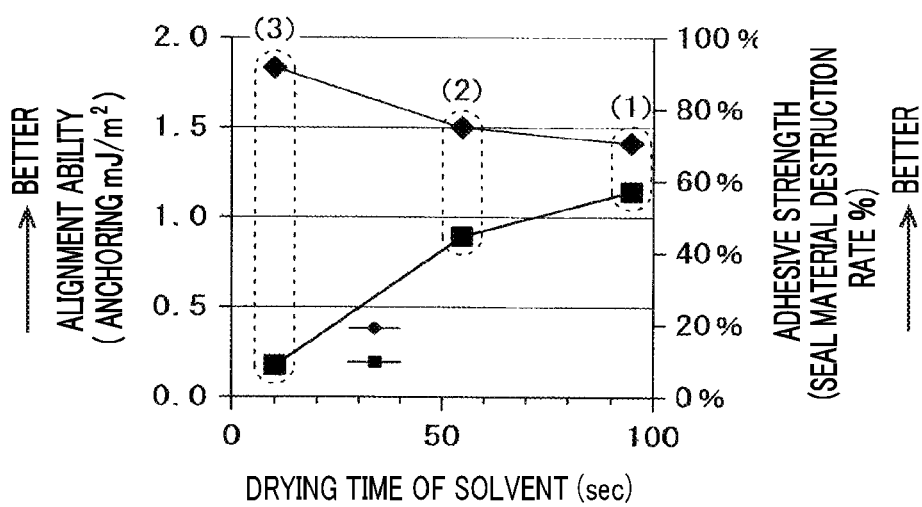
FIG. 15 is a graph that shows relations between drying condition of the alignment film and the alignment ability of the alignment film and between drying condition of the alignment film and the adhesive strength of the alignment film with the seal material.

FIG. 15 is a graph that shows relations between the drying speed of the solvent and the alignment ability of the alignment film and between the drying speed of the solvent and the adhesive strength of the alignment film with the seal material. The abscissa of FIG. 15 is drying time of the solvent. The left hand ordinate is alignment ability of the alignment film, which is defined by anchoring strength ($mJ/m^2$). Anchoring strength shows how strong the liquid crystal molecule is fixed on the surface of the alignment film. The measuring method is described in e.g. patent document 3. The ordinate of right hand side is a value of adhesive strength between the alignment film and the seal material. When the adhesive strength between the seal material and the alignment film is strong, the seal material is broken instead of pealing at the interface between the seal material and the alignment film when the TFT substrate and the counter substrate are forcibly separated from each other. If the ratio, at which the seal material is broken, is higher, it is determined as that the adhesive strength between the seal material and the alignment film is higher.

The drying conditions (1), (2), and (3) in FIG. 15 correspond to the drying conditions (1), (2), and (3) in FIG. 14. In FIGS. 14 and 15, drying speed is higher in the order of (3), (2), and (1). In FIG. 15, the alignment ability is improved when the drying speed becomes quicker. On the other hand, the adhesiveness is increased when the drying speed becomes longer. This phenomenon is explained as that, in the coated alignment film material, if the drying time is long, realignment will occur between the precursor (maybe referred to as the first precursor, here in after) of the polyimide, which receives photo alignment treatment, and the precursor (maybe referred to as the second precursor, here in after) of the polyimide, which does not receive photo alignment treatment; and thus, the first precursor tends to move from the surface to the bottom direction in the alignment film.

FIG. 16 is a table, which summarizes the evaluations in FIG. 14 and FIG. 15. In FIG. 16, when drying speed is quick, the adhesiveness between the alignment film and the seal material is low however, the alignment ability of the alignment film is comparatively high. In contrast, when drying speed is slow, the alignment ability of the alignment film decreases, however, adhesiveness between the alignment film and the seal material is high.

As explained above, the structure of the alignment film can be controlled by drying temperature condition of the alignment film. However, it is not easy to change the temperature of the furnace in the actual manufacturing process. Further, if the structure of the alignment film is intended to be changed according to the products, the temperature condition of the furnace needs to be changed according to the products; however, this is a heavy burden for the manufacturing process.

One feature of the present invention is to control drying condition of the alignment film by changing the composition of the solvent in the alignment film material, and thus, to control the alignment ability of the alignment film and the adhesive strength between the alignment film and the seal material. The alignment film material is that the precursor of the polyimide, which receives photo alignment treatment and the precursor of the polyimide, which does not receive photo alignment treatment, are solved in the solvent. The drying time of the alignment film material can be controlled by composition of the solvent.

For example, a mixture of NMP (N-Methyl-2-Pyrrolidone, the structure is chemical formula 5), GBL (gamma butyrolactone, the structure is chemical formula 6) and BCS (butyl cellosolve, the structure is chemical formula 7) is used for the solvent. The vapor pressure of NMP at 25 degree C. is 0.29 mmHg, the vapor pressure of GBL is 0.45 mmHg, and the vapor pressure of BCS is 0.88 mmHg. The drying time is changed according to the ratio of the composition of the solvent, however, the influence of amount of NMP, which has low vapor pressure, is dominant.

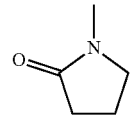

Chemical formula 5

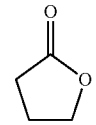

Chemical formula 6

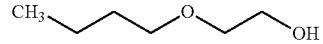

Chemical formula 7

Figure 17:
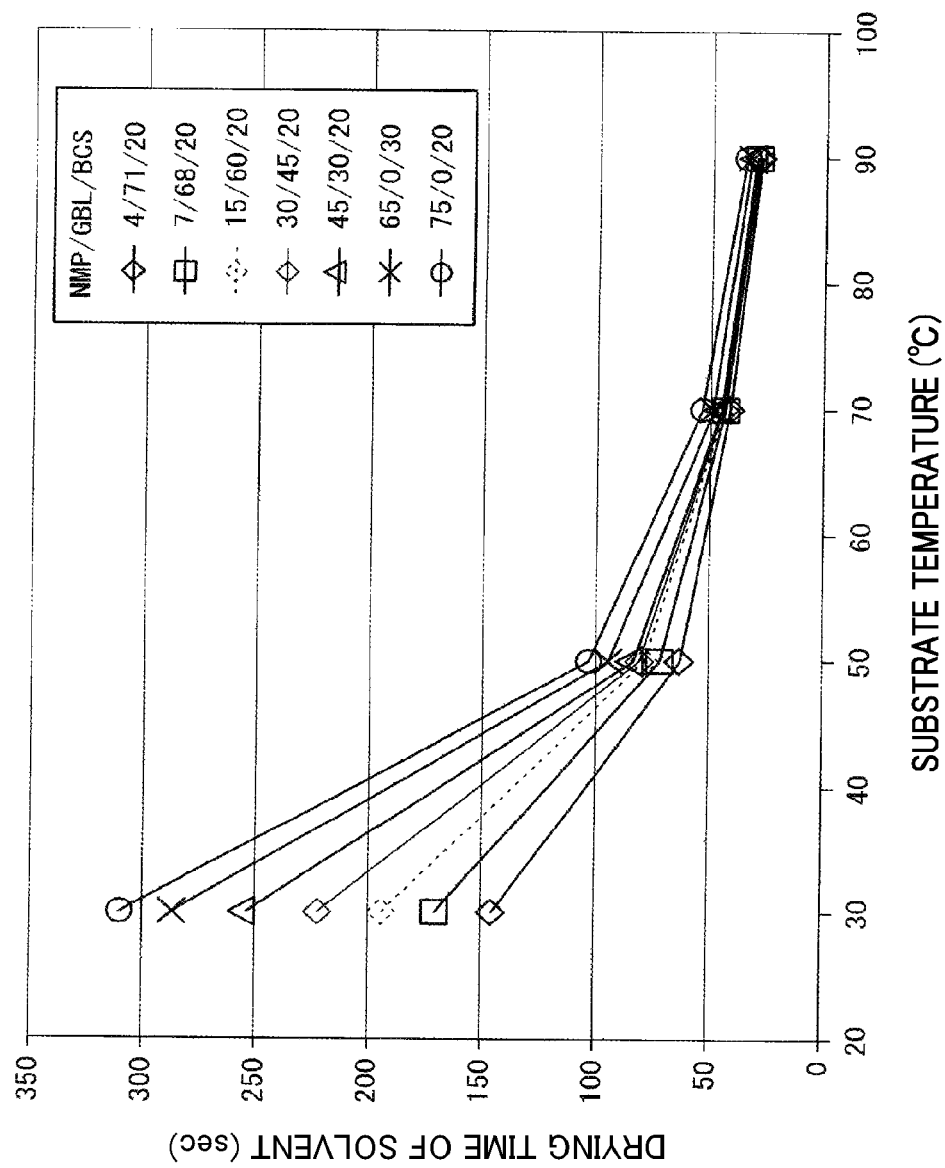
FIG. 17 is a graph that shows a relation between the temperature of the TFT substrate, on which the alignment film is formed, and drying time with changing the vapor pressure of the solvents as a parameter.

FIG. 17 is a graph that shows a relation between the temperature of the substrate on which the alignment film is coated and the time for drying of the solvent by taking a mixture ratio of the composition of the solvent as the parameters. In FIG. 17, the abscissa is temperature of the substrate and the ordinate is time for drying of the solvent. In FIG. 17, the drying time is shown when the mixture ratio is changed in seven kinds; specifically, the ratio of NMP, which has low vapor pressure, is changed widely.

In FIG. 17, when drying is made in relatively low temperature, drying time can be changed widely according to the ratio of NMP. That is to say, even if the solvent consists of three materials, the drying time can be controlled easily by focusing on the substance of the lowest vapor pressure, and by changing only the ratio of this substance in the solvent. This means the manufacturing process condition can be set easily. In other words, the alignment ability of the alignment film and adhesive strength between the alignment film and the seal material can be controlled by changing only the ratio of the substance which has the lowest vapor pressure in the solvent.

Figure 18:
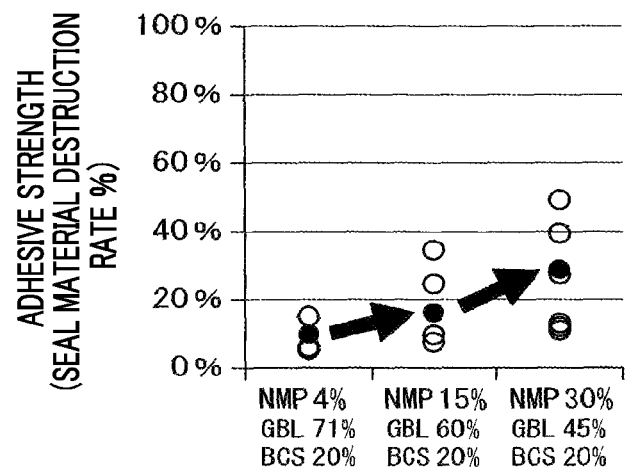
FIG. 18 is a graph that shows a relation between the vapor pressure of the solvents and the adhesive strength of the alignment film with the seal material.

FIG. 18 is a graph that shows an adhesive strength between the seal material and the alignment film when the composition ratio of the solvent is changed under the condition that polyamide acid ester is used as the precursor for the polyimide which receives photo alignment treatment and polyamide acid is used as the precursor for the polyimide which does not receive photo alignment treatment. The abscissa of FIG. 18 is ratios of three compositions of solvents, specifically, a ratio of NMP is changed widely. The ordinate is adhesive strength between the alignment film and the seal material, which is evaluated by a rate that the seal material is broken without peeling off between the alignment film and the seal material at the interface. In FIG. 18, each of the white circles indicates individual evaluation results, and each of the black circles indicates mean values. The adhesive strength between the alignment film and the seal material increases according to a ratio of NMP in the solvent increases.

Figure 19:
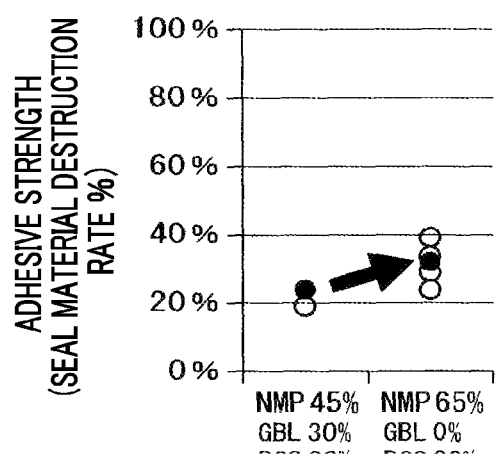
FIG. 19 is another graph that shows a relation between the vapor pressure of the solvents and the adhesive strength of the alignment film with the seal material.

FIG. 19 is a graph that shows an adhesive strength between the seal material and the alignment film when the composition ratio of the solvent is changed under the condition that polyamide acid is used for both the polyimide which receives photo alignment treatment and the polyimide which does not receive photo alignment treatment. The abscissa and the ordinate in FIG. 19 are the same as the abscissa and the ordinate in FIG. 18, however, ratios of NMP are in higher range in abscissa than that of FIG. 18. As shown in FIG. 19, even in a range that ratio of NMP is high, it is the same as FIG. 18 in that the adhesive strength between the alignment film and the seal material increases according to a ratio of NMP in the solvent increases.

Figure 20:
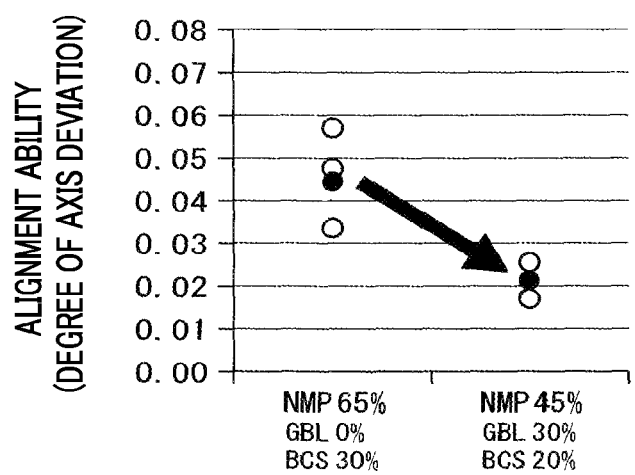
FIG. 20 is a graph that shows a relation between the vapor pressure of the solvents and the alignment ability of the alignment film.

FIG. 20 is a graph that shows a change in alignment ability of the alignment film when the composition ratio of the solvent is changed under the condition that polyamide acid is used for both the polyimide which receives photo alignment treatment and the polyimide which does not receive photo alignment treatment. The abscissa in FIG. 20 is a ratio of NMP in the solvent as in FIGS. 18 and 19. The ordinate in FIG. 20 is alignment ability which is evaluated by deviation of alignment axis. That is to say, if anchoring strength of the alignment film is weak, axes of molecules on the surface of the alignment film deviate from the easy axis due to elastic twisting force during alignment of the liquid crystal molecules. This phenomenon is defined by the axis deviation in this specification. Therefore, it is preferable that the axis deviation is small.

As shown in FIG. 20, according to the ratio of NMP becomes smaller, the amount of the axis deviation becomes smaller, namely, alignment control force becomes stronger. That is to say, if the ratio of NMP is smaller, the drying speed increases; as a result, alignment control force increases.

As shown in FIGS. 18 through 20, a drying speed of the solvent as a whole can be actually changed by changing the ratio of NMP, as a result, the alignment ability of the alignment film and adhesive strength between the alignment film and the seal material can be controlled. Therefore, this means substantially simplify the performance design of the liquid crystal display device and the design of the manufacturing process of the liquid crystal display device.

In FIGS. 17 through 20, NMP is used as the solvent of the lowest vapor pressure among the three solvents. However, the solvent of the lower vapor pressure is not limited to NMP, but e.g. NEP (N-Ethyl-Pyrrolidone) (vapor pressure at 25 degree C. is 0.276 mmHg) can be used. Further, the solvent is not necessarily limited to the above materials; the drying time can be changed by using the solvent having 0.35 mmHg or less at 25 degree C., and changing the ratio of this material in the mixture of solvent, and thus, the alignment ability of the alignment film and adhesive strength between the alignment film and the seal material can be controlled.

As explained above, when a photo alignment film is adopted, there is a problem of a balance between the alignment ability of the alignment film and the adhesive strength between the alignment film and the seal material. This balance can be different among the products. That is to say, a distribution between the polyimide, which receives the photo alignment treatment, and the polyimide, which does not receive the photo alignment treatment, needs to be controlled. According to the present invention, the structure of the alignment film can be easily controlled by changing the solvent, which has the lowest vapor pressure among the mixture of the solvents in the alignment film material.

For example, if the first polyamide acid, which has cyclobutane skeleton and receives photo alignment treatment, instead of using the polyamide acid ester, which has a large difference in polarity from the polyamide acid, and the second polyamide acid, which does not have cyclobutane skeleton and does not receive photo alignment treatment, are used for the alignment film, the alignment ability of the alignment film and the adhesive strength between the alignment film and the seal material can be controlled by adjusting the compositions of the solvent. Concretely, the alignment film of high alignment ability can be obtained by setting the ratio of solvent having vapor pressure of 0.35 mmHg or less at 25 degree C. at less than 65 weight % among the mixture of solvents. The alignment ability can be more improved by setting the ratio of solvent having vapor pressure of 0.35 mmHg or less at 25 degree C. at less than 45 weight % among the mixture of solvents; the alignment ability can be further improved by setting the ratio of solvent having vapor pressure of 0.35 mmHg or less at 25 degree C. at less than 30 weight % among the mixture of solvents. In those cases, adhesive strength with the seal material as well as the alignment ability of the alignment film can be secured under the condition that: the polyimide, which receives the alignment treatment, exists 75 to 98 weight %, preferably, 75 to 85 weight % at the surface of the alignment film on the pixel electrode, or on the insulating film between the pixel electrodes, and at the interface with the seal material.

In the meantime, if the solvents of different vapor pressure are mixed, drying time is different according to temperature to dry the mixture of the solvents. If the drying temperature is high, a difference in drying time according to the ratio of the solvents becomes hard to occur; therefore, drying temperature for the solvent is preferably 70 degree C. or less. Further, a difference in drying time according to the ratio of the solvents becomes larger if the drying temperature is 50 degree C. or less. A productivity can be increased by drying the alignment film in short time without controlling precisely the mixture rate of the solvents, scarifying the adhesiveness between the alignment film and the seal material and the alignment ability of the alignment film to some extent. On the other hand, the products of higher adhesiveness between the alignment film and the seal material and higher alignment ability of the alignment film can be realized by precisely controlling the mixture rate of the solvents, even the productivity is sacrificed to some extent.

What is claimed is:
1. A liquid crystal display device comprising:
   a first substrate, having pixel electrodes and a first alignment film,
   a second substrate adhering to the first substrate at a periphery through a seal material, and
   liquid crystal being sealed inside,
   wherein the first alignment film is formed from a first polyimide, which receives a photo alignment treatment, and a second polyimide, which does not receive the photo alignment treatment,
   the first polyimide exists 75 to 98 weight % at a surface of the first alignment film on the pixel electrode and at an interface with the seal material,
   the second polyimide increases gradually in going to depth direction from the surface of the first alignment film in a cross sectional view, and
   dielectric anisotropy of the liquid crystal is positive.
2. The liquid crystal display device according to claim 1, wherein, the first polyimide is formed from precursor of polyamide acid, which includes cyclobutane,
   the second polyimide is formed from precursor of polyamide acid, which does not include cyclobutane.
3. The liquid crystal display device according to claim 2, wherein, a number average molecular weight of the first polyimide is larger than a number average molecular weight of the second polyimide.
4. The liquid crystal display device according to claim 2, wherein, an imidization rate of the first polyimide is larger than an imidization rate of the second polyimide.
5. The liquid crystal display device according to claim 1, wherein, the first polyimide is formed from precursor of polyamide acid ester, which includes cyclobutane,
   the second polyimide is formed from precursor of polyamide acid, which does not include cyclobutane.

6. The liquid crystal display device according to claim 1,
wherein, the second substrate has a color filter and a second alignment film,
the second alignment film is formed from the first polyimide and the second polyimide,
the first polyimide exists 75 to 98 weight % at a surface of the second alignment film on the color filter and at an interface with the seal material,
the second polyimide increases gradually in going to depth direction from the surface of the second alignment film in a cross sectional view.

7. The liquid crystal display device according to claim 1,
wherein, the first polyimide exists 75 to 85 weight % at a surface of the first alignment film on the pixel electrode and at an interface with the seal material.

8. The liquid crystal display device according to claim 6,
wherein the first polyimide exists 75 to 80 weight % at a surface of the second alignment film on the color filter and at an interface with the seal material.

9. A liquid crystal display device comprising:
a first substrate, having pixel electrodes and a first alignment film,
a second substrate adhering to the first substrate at a periphery through a seal material, and
liquid crystal being sealed inside,
wherein the first alignment film is formed from a first polyimide, which receives a photo alignment treatment, and a second polyimide, which does not receive the photo alignment treatment,
the first polyimide exists 75 to 98 weight % in a range of 10 nm from a surface in depth direction of the first alignment film on the pixel electrode and at an interface with the seal material,
the second polyimide increases gradually in going to depth direction from the surface of the first alignment film in a cross sectional view, and
dielectric anisotropy of the liquid crystal is positive.

10. The liquid crystal display device according to claim 9,
wherein, the first polyimide is formed from precursor of polyamide acid, which includes cyclobutane,
the second polyimide is formed from precursor of polyamide acid, which does not include cyclobutane.

11. The liquid crystal display device according to claim 10,
wherein, a number average molecular weight of the first polyimide is larger than a number average molecular weight of the second polyimide.

12. The liquid crystal display device according to claim 10,
wherein, an imidization rate of the first polyimide is larger than an imidization rate of the second polyimide.

13. The liquid crystal display device according to claim 9,
wherein, the first polyimide is formed from precursor of polyamide acid ester, which includes cyclobutane,
the second polyimide is formed from precursor of polyamide acid, which does not include cyclobutane.

14. The liquid crystal display device according to claim 9,
wherein, the second substrate has a color filter and a second alignment film,
the second alignment film is formed from the first polyimide and the second polyimide,
the first polyimide exists 75 to 98 weight % in a range of 10 nm from a surface in depth direction of the second alignment film on the color filter and at an interface with the seal material, the second polyimide increases gradually in going to depth direction from the surface of the second alignment film in a cross sectional view.

15. The liquid crystal display device according to claim 9,
wherein the first polyimide exists 75 to 85 weight % in the range of 10 nm from the surface in depth direction of the first alignment film on the pixel electrode and at an interface with the seal material.

16. The liquid crystal display device according to claim 14, wherein the first polyimide exists 75 to 85 weight % in the range of 10 nm from the surface in depth direction of the second alignment film on the color filter and at an interface with the seal material.

* * * * *